May 27, 1941.    K. ONO ET AL    2,243,575
MULTIPLE SWITCHING APPARATUS AND METHOD
Filed Nov. 21, 1938
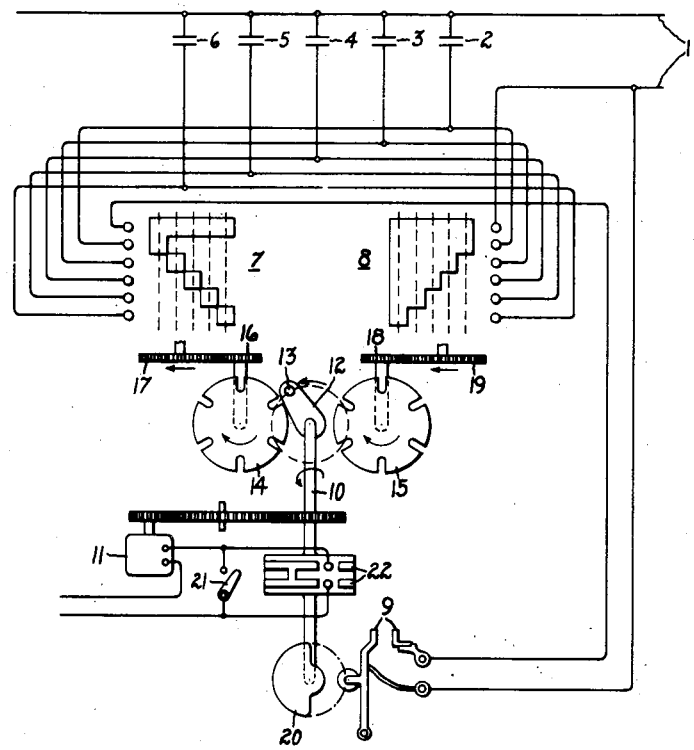
Inventors:
Kunitaro Ono,
Saburo Ikeda,
by Harry C. Dunham
Their Attorney.

Patented May 27, 1941

2,243,575

UNITED STATES PATENT OFFICE 2,243,575

MULTIPLE SWITCHING APPARATUS AND METHOD

Kunitaro Ono and Saburo Ikeda, Yokohama, Japan, assignors to General Electric Company, a corporation of New York Application November 21, 1938, Serial No. 241,712
In Japan November 29, 1937

9 Claims. (Cl. 172—246)

This invention relates to an improved way of cumulatively or successively connecting and disconnecting a plurality of electrical devices to and from an electric circuit.

The invention is characterized by the use of the simplest kind of a circuit maker and breaker which controls the actual completion of the circuit or the interruption of the current each time any one of the devices is connected to the circuit or disconnected therefrom. This circuit maker and breaker may be a simple single-pole single-throw switch. The selection of the particular device to be connected or disconnected is controlled by a selector switch which may be inexpensively constructed, as it is not required to interrupt any current or perform any arcing duty. The maintenance of each connection after it has been established by the closing of the arcing duty switch is controlled by a holding or seal-in switch.

By performing the switching in this manner the number of units to be connected and disconnected from the electric circuit may be increased without substantially increasing the cost of the apparatus because the selecting and holding switches may be relatively inexpensive devices and the arcing duty switch will be the same regardless of the number of units to be switched.

While the invention may be used generally with electrical devices or units of various kinds, it has been found that it is particularly well adapted for connecting and disconnecting a plurality of power factor correcting capacitors to an alternating current circuit because, as the device readily lends itself to use with a relatively large number of units, the required capacitance may be divided into a relatively large number of small capacitors, thus obtaining smooth power factor control.

An object of the invention is to provide a new and improved way of performing a multiple switching operation.

Another object of the invention is to provide a multiple switching arrangement which is simple in construction and accurate in operation.

The invention will be better understood from the following description taken in connection with the accompanying drawing and its scope will be pointed out in the appended claims.

The single figure of the accompanying drawing is a diagrammatic view of the arrangement embodying the invention.

Referring now to the drawing, a main circuit 1, which may for example be considered an alternating current power line, is provided with a plurality of power factor correcting capacitors 2, 3, 4, 5 and 6 which are to be connected successively in parallel across the circuit and removed therefrom in the same way. A selector switch 7, shown by way of example as a drum contactor, is provided with a number of fixed contacts connected respectively to the free terminals of the capacitors. The common contact of switch 7 is connected to one side of the main circuit. A holding or seal-in switch 8, which is also shown by way of example as a drum contactor, is provided with a plurality of fixed contacts connected respectively to the fixed contacts of the selector switch 7 or to the free terminals of the capacitors. The common contact of the seal-in switch 8 is connected to one side of the main circuit so that the switch 8, in effect, completes holding or seal-in connections around the portion of the circuit containing the selector switch 7. Connected in series with the selector switch 7 is a main arcing duty switch 9.

In order to provide automatic operation of the switches 7, 8 and 9 in the proper sequence, they are shown by way of example as being mechanically interlocked through a common driving or operating member or shaft 10 which may either be manually rotated or driven by a motor 11. In the embodiment shown in the drawing, an arm 12 is mounted on the operating shaft 10 and the arm 12 is provided with a pin 13 projected therefrom. Two Geneva gears 14 and 15 are so arranged in the locus of movement of the pin 13 that the gear 14 drives the selector switch 7 through gears 16 and 17 and the gear 15 drives the seal-in switch 8 through gears 18 and 19. The operating shaft 10 is also provided with a cam 20 which is adapted to repeatedly control the arcing duty switch 9 each time that the shaft 10 makes one revolution.

The starting of the motor 11 is controlled by a switch 21, while the stopping of the motor is controlled by a set of seal-in contacts 22 on the shaft 10 which insures that the motor will continue operation long enough to complete a full switching cycle.

The automatic operation is as follows. In the condition shown in the drawing all the condensers are disconnected from the circuit. If the switch 21 is closed to start the motor 11, the operating shaft 10 is driven in the direction shown by the arrow to immediately close the switch 22 and therefore the motor 11 continues its operation even though the switch 21 is opened. By the rotation of the operating shaft 10 the pin 13 engages with the Geneva gear 14 at first to rotate it through a given angle and move the contactor 7 to a position which permits the condenser 2 to be selected through the contacts of the switch 7. Further rotation of the operating shaft 10 causes the cam 20 to close the arcing duty switch 9 and connect the condenser 2 across the circuit 1 through the switches 7 and 9 in series. Continued rotation of the pin 13 causes the Geneva gear 15 to advance one notch and move the seal-in switch 8 to a position which causes the contactor 8 to complete a shunt circuit with respect to the selector switch 7 and the arcing duty switch 9, thereby completing a holding circuit for the condenser 2. Still further rotation of the shaft 10 causes the cam 20 to open the arcing duty switch 9 and shortly thereafter the seal-in contacts 22 will open, thus stopping the motor 11 and completing one revolution of the shaft 10. The current of condenser 2 will now be carried by the holding switch 8.

Similarly, each of the condensers 3, 4, 5 and 6 may successively be selected and inserted in the electric circuit by merely reclosing the control switch 21 and it will be noted that in each case it is only the switch 9 which actually carries the condenser in-rush current. Finally, by continued rotation of the operating shaft, the switches 7 and 8 will be moved to such positions that all of the condensers will be disconnected.

If before this final position is reached, it is desired to disconnect one or more condensers the shaft 10 may be rotated in the opposite direction, thereby first closing the arcing duty switch 9, then opening the holding switch 8, then opening the arcing duty switch 9, whereby the current in one of the condensers is interrupted, and then opening the selector switch 7. In this manner, the condensers may successively be disconnected from the circuit.

While the automatic operation of the three switches insures their arcing operation and prevents any erroneous movement of the switches and avoids any accidental danger due to the operator's carelessness, this automatic operation is not essential and the three switches may be operated manually in the sequence described above in connection with the automatic operation.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States, is:

1. In combination, an electric circuit, a plurality of electrical devices, and means for successively connecting said devices to said circuit and disconnecting them therefrom comprising a multi-position selector switch for selecting the device to be connected to said circuit or disconnected therefrom, a current interrupting switch serially connected with said selector switch for completing and interrupting the circuit connection of whichever device is selected by said selector switch, and a holding switch connected in shunt circuit relation to said selector switch and current interrupting switch for maintaining the connection of a device when said current interrupting switch is opened in preparation for the selection of another device by said selector switch.

2. In combination, an electric circuit, a plurality of electrical devices, and means for successively connecting said devices to said circuit and disconnecting them therefrom comprising a multi-position selector switch for selecting the device to be connected to said circuit or disconnected therefrom, a current interrupting switch serially connected with said selector switch for completing and interrupting the circuit connection of whichever device is selected by said selector switch, a holding switch connected in shunt circuit relation to said selector switch and current interrupting switch for maintaining the connection of a device when said current interrupting switch is opened in preparation for the selection of another device by said selector switch, and common driving means for all of said switches.

3. In combination, an electric circuit, a plurality of electrical devices, and means for successively connecting said devices to said circuit and disconnecting them therefrom comprising a multi-position selector switch for selecting the device to be connected to said circuit or disconnected therefrom, a current interrupting switch serially connected with said selector switch for completing and interrupting the circuit connection of whichever device is selected by said selector switch, a holding switch connected in shunt circuit relation to said selector switch and current interrupting switch for maintaining the connection of a device when said current interrupting switch is opened in preparation for the selection of another device by said selector switch, and common driving means for all of said switches, said holding switch being arranged to open before said current interrupting switch opens when said driving means is operated in the direction for causing successive disconnection of said devices.

4. Switching means for successively connecting a plurality of capacitors to an alternating current circuit and disconnecting them therefrom comprising, in combination, a selector switch for selecting the capacitor to be connected or disconnected, a current-interrupting contactor connected in series with said selector switch, and a seal-in switch connected in parallel with said serially-connected selector switch and contactor, said contactor being interlocked with said switches so that it is open when said selector switch is opening and closing and is closed when said seal-in switch is closing and opening, said switches being interlocked so that said seal-in switch closes after said selector switch closes when a capacitor is being connected to said circuit and opens before said selector switch opens when a capacitor is being disconnected from said circuit.

5. Switching means for selectively successively connecting to and disconnecting from one side of an alternating current circuit a plurality of capacitors each having a terminal connected to the other side of said circuit comprising, in combination, reversible operating means, a selector switch having a plurality of fixed contacts for connection to the remaining terminals of the capacitors respectively and having a movable contact driven by said operating means for engaging and disengaging said fixed contacts one at a time, an arcing contactor driven by said operating means and connected between said movable contact and said one side of said circuit, and a seal-in switch having a plurality of fixed contacts connected respectively to the fixed contacts of said selector switch and having a movable contact connected to the other side of said circuit and driven by said operating means for selectively cumulatively engaging and successively disengaging said fixed contacts, said arcing contactor being open when said selector switch is opening and closing and being closed when said seal-in switch is opening and closing.

6. The method of successively disconnecting a plurality of parallel connected electrical impedance devices from an electric circuit comprising making a bridging connection including a closed switch around a portion of the normal connection of one of said devices to said circuit, opening said portion, opening said switch, making a second bridging connection including said opened switch around a portion of the normal connection of another of said devices to said circuit, reclosing said switch, opening said portion of the normal connection of the other one of said devices to said circuit, and reopening said switch.

7. The method of cumulatively connecting a plurality of parallel connected electrical impedance devices to an electric line comprising setting up a circuit containing an open switch for connecting one of said devices to said line, closing said switch, completing a seal-in circuit for maintaining the connection of said device independently of the opening of said switch, reopening said switch, setting up a second circuit containing said reopened switch for connecting another of said devices to said line independently of said seal-in circuit, reclosing said switch, and completing a second seal-in circuit for maintaining the connection of said other device independently of the opening of said switch.

8. In combination, an alternating current circuit, a plurality of electrical devices, and switching means for successively connecting said electrical devices to said circuit and disconnecting them therefrom comprising a selector switch for selecting the electrical device to be connected or disconnected, a current-interrupting contactor connected in series with said selector switch, and a seal-in switch connected in parallel with said serially-connected selector switch and contactor, said contactor being interlocked with said switches so that it is open when said selector switch is opening and closing and is closed when said seal-in switch is closing and opening, said switches being interlocked so that said seal-in switch closes after said selector switch closes when an electrical device is being connected to said circuit and opens before said selector switch opens when an electrical device is being disconnected from said circuit.

9. In combination, an alternating current circuit, a plurality of electrical devices each having a terminal connected to one side of said circuit, and switching means for selectively successively connecting said electrical devices to said circuit and disconnecting them therefrom comprising reversible operating means, a selector switch having a plurality of fixed contacts each connected to the remaining terminals of the electrical devices respectively and having a movable contact driven by said operating means for engaging and disengaging said fixed contacts one at a time, an arcing contactor driven by said operating means and connected between said movable contact and the other side of said circuit, and a seal-in switch having a plurality of fixed contacts connected respectively to the fixed contacts of said selector switch and having a movable contact connected to the other side of said circuit and driven by said operating means for selectively cumulatively engaging and successively disengaging said fixed contacts, said arcing contactor being open when said selector switch is opening and closing and being closed when said seal-in switch is opening and closing.

KUNITARO ONO.
SABURO IKEDA.